UNITED STATES PATENT OFFICE.

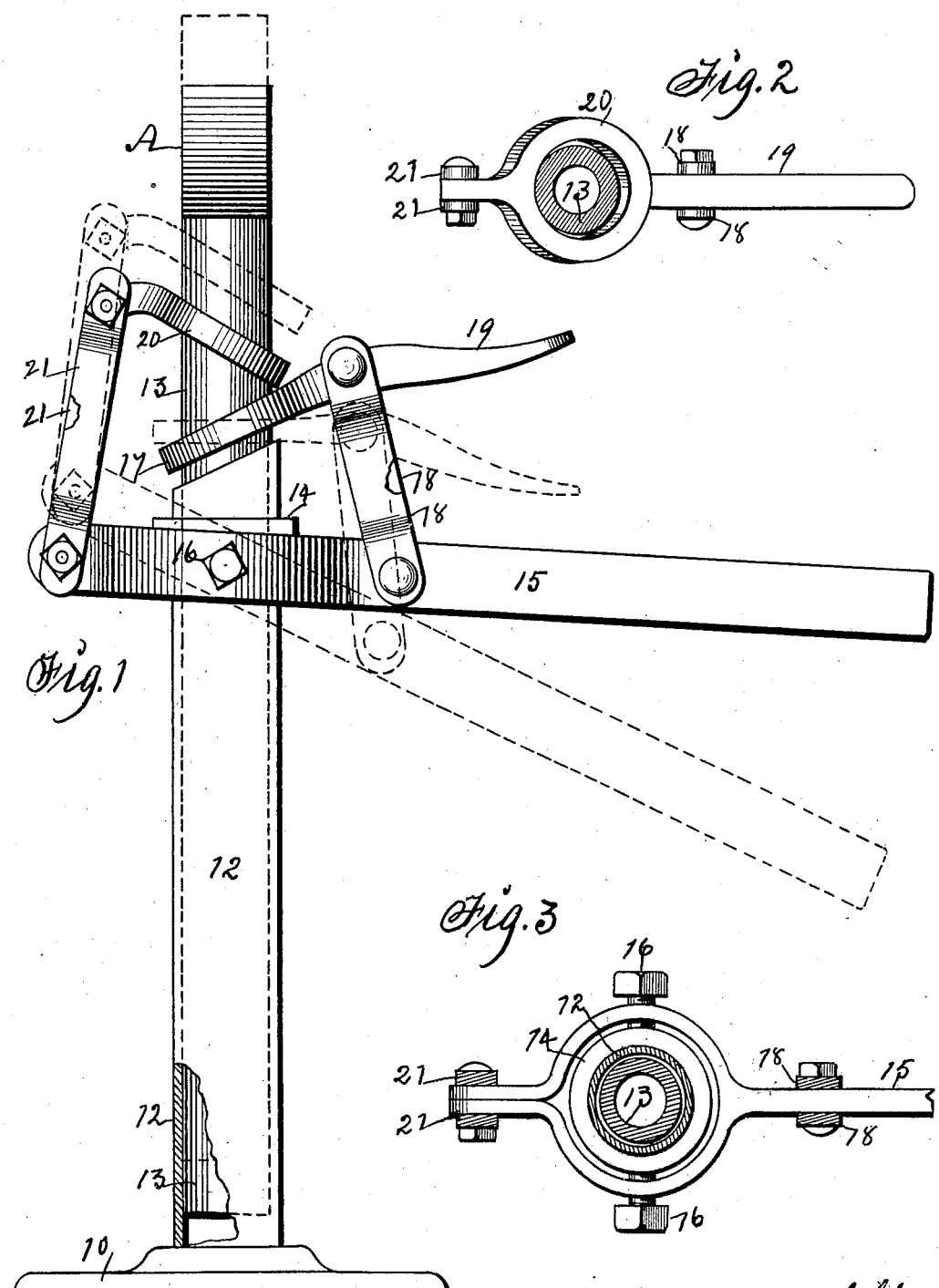

MARK HUNEFELD AND BERT C. LAUB, OF LAKE CITY, IOWA; SAID LAUB ASSIGNOR TO SAID HUNEFELD.

LIFTING-JACK.

No. 830,479.　　　Specification of Letters Patent.　　　Patented Sept. 4, 1906.

Application filed November 16, 1905. Serial No. 288,087.

*To all whom it may concern:*

Be it known that we, MARK HUNEFELD and BERT C. LAUB, citizens of the United States, residing at Lake City, in the county of Calhoun and State of Iowa, have invented a new and useful Double-Clutch Lifting-Jack, of which the following is a specification.

Our object is, first, to provide means for lifting the upper part of a telescope-standard a long or short space by the single motion of a lever; second, to support the upper portion of the standard in an elevated position by means of two clutches that encircle it and hold it securely when subjected to weight; third, in adjustably connecting two clutches with a lever, as required for operating them simultaneously for lifting the axle and wheel of a wagon or other weight resting on the top of the jack; fourth, in detachably connecting the two parts of the standard, the lever, and the two clutches to facilitate packing and shipping and economizing space.

Our invention consists in the construction, arrangement, and combination of parts, as hereinafter set forth, pointed out in our claims, and illustrated in the accompanying drawings, in which—

Figure 1 is a side elevation of the machine, and dotted lines indicate the motions of the movable parts. Fig. 2 is a transverse sectional view looking down from a line above the upper clutch and shows the arm extending horizontally from the lower clutch. Fig. 3 is a transverse sectional view on a line immediately above the lever and shows how the lever is fulcrumed to the tubular part of the standard.

The numeral 10 designates the flat-bottomed base, to which is fixed the tubular part 12, of the standard. The portion 13 of the standard has an enlargement A at its top and is fitted in the tubular part to be raised and lowered therein. A collar 14 is formed integral with or fixed to the upper end of the part 12, and a lever 15 is detachably fulcrumed to the collar by means of screws 16, seated in the collar to extend in opposite directions from the standard or in any suitable way.

The top of the part 12 is inclined, as shown in Fig. 1, and a circular clutch 17 is connected with the long arm of the lever 15 by means of mating links 18 in such a manner that the clutch can be lowered to incline parallel with said inclined top, as required to bite fast to the surface of the movable part 13 of the telescopic standard, as shown in Fig. 1. An arm 19 extends from the clutch 17, and by depressing the arm the clutch is released from the movable tubular standard 13, as required to take a new hold when the standard is held up by another circular clutch 20, connected with the short arm of the lever 15 by means of mating links 21, as shown in Fig. 1.

In the practical use of our invention when the lever 15 and the two clutches 18 and 20 are in position, as shown in solid lines in Fig. 1, both clutches have hold of the part 13 of the standard, as required to retain it above its downward limit at any point of elevation desired. By depressing the lever the hold of the lower clutch 17 is relaxed and the upper clutch 20 and the upper part 13 of the standard are jointly elevated to different degrees of space, as may be desired in lifting a weight on the enlarged top A of the standard. To lower the upper part 13 of the standard at any time when it is above its normal low position, the long arm of the lever 15 must be elevated to bring the rear end of the lower clutch 17 in contact with the front end of the upper clutch 20, and then while the lever 15 is held stationary the arm 19 of the clutch 17 must be depressed, as required to simultaneously release the hold of both clutches and allow the part 13 of the standard to drop by force of gravity.

Having thus set forth the purposes of our invention, its construction, and manner of use, the practical operation and utility thereof will be obvious to machinists and persons familiar with the art to which it pertains.

What we claim as new, and desire to secure by Letters Patent, is—

1. In a lifting-jack, a telescopic standard and the top of the lower part inclined, a lever fulcrumed to the top portion of the lower part of the standard to extend in opposite directions therefrom and a clutch connected with the long arm of the lever as set forth.

2. In a lifting-jack, a telescopic standard and the top of its lower part inclined, a lever fulcrumed to the top portion of the lower part of the standard to extend in opposite directions therefrom, a clutch connected with the short arm of the lever and a clutch connected with the long arm and the upper movable part of the standard provided with an enlargement for supporting a weight.

3. In a lifting-jack, a base, a tubular standard extending up from the base and its top inclined, a collar at its top portion and a lever fulcrumed to the collar by screws passed through apertures in the lever and seated in the collar.

4. In a lifting-jack, a base, a tubular standard extending up from the base and its top inclined, a collar at its top portion and a lever fulcrumed to the collar by screws passed through apertures in the lever and seated in the collar, a circular clutch connected with the long arm of the lever and a circular clutch connected with the short arm of the lever and a movable part of the standard extended down through the two circular clutches and into the lower tubular part of the standard.

5. A lifting-jack comprising a base, a telescopic standard, a lever fulcrumed to the upper end of the tubular part of the standard, a circular clutch having an arm pivotally connected with the long arm of the lever by means of mating links and a circular clutch pivotally connected with the short arm of the lever by mating links, to operate in the manner set forth for the purposes stated.

MARK HUNEFELD.
BERT C. LAUB.

Witnesses:
R. H. ORWIG,
THOMAS G. ORWIG.